United States Patent
Novo Diaz

(10) Patent No.: US 11,381,947 B2
(45) Date of Patent: Jul. 5, 2022

(54) THING DESCRIPTION TO RESOURCE DIRECTORY MAPPING

(71) Applicant: Telefonaktiebolaget LM Ericsson (publ), Stockholm (SE)

(72) Inventor: Oscar Novo Diaz, Helsinki (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 17/045,307

(22) PCT Filed: Apr. 6, 2018

(86) PCT No.: PCT/EP2018/058870
§ 371 (c)(1),
(2) Date: Oct. 5, 2020

(87) PCT Pub. No.: WO2019/192722
PCT Pub. Date: Oct. 10, 2019

(65) Prior Publication Data
US 2021/0219117 A1    Jul. 15, 2021

(51) Int. Cl.
*H04W 4/70* (2018.01)
*G06F 16/955* (2019.01)
*H04L 67/125* (2022.01)
*H04W 60/00* (2009.01)

(52) U.S. Cl.
CPC .......... *H04W 4/70* (2018.02); *G06F 16/9558* (2019.01); *H04L 67/125* (2013.01); *H04W 60/00* (2013.01)

(58) Field of Classification Search
CPC ... H04L 63/102; H04L 67/16; H04L 65/1073; H04W 4/70; H04W 4/38; H04W 72/005; G06F 16/24
See application file for complete search history.

(56) References Cited

U.S. PATENT DOCUMENTS

| 2012/0151028 A1* | 6/2012 | Lu | H04W 4/18 709/223 |
| 2014/0025825 A1* | 1/2014 | Ukkola | H04W 4/70 709/226 |
| 2015/0264134 A1* | 9/2015 | Dong | H04L 67/16 709/204 |

(Continued)

FOREIGN PATENT DOCUMENTS

WO  WO 2017019021 A1  1/2017

OTHER PUBLICATIONS

Shelby et al. CoRE Resource Directory, Mar. 1, 2018, pp. 1-70 (Year: 2018).*

(Continued)

*Primary Examiner* — Tonia L Dollinger
*Assistant Examiner* — Linh T. Nguyen
(74) *Attorney, Agent, or Firm* — Sage Patent Group

(57) ABSTRACT

A method includes providing a Thing Description file for an Internet of Things, IoT, device, the Thing Description file including information describing a resource provided by the IoT device, mapping the Thing Description file to a Resource Directory registration command, and transmitting the Resource Directory registration command to a Resource Directory to register the resource in the Resource Directory. Related devices and computer program products are also disclosed.

21 Claims, 12 Drawing Sheets

(56) References Cited

U.S. PATENT DOCUMENTS

| | | | |
|---|---|---|---|
| 2016/0198404 A1* | 7/2016 | Tsiatsis | H04W 52/02 |
| | | | 455/507 |
| 2016/0337216 A1* | 11/2016 | Kausik | H04L 12/26 |
| 2017/0124193 A1* | 5/2017 | Li | G06F 16/951 |
| 2017/0251325 A1* | 8/2017 | Sakamoto | H04W 4/00 |
| 2018/0041566 A1* | 2/2018 | Huang | H04L 67/06 |
| 2018/0088851 A1* | 3/2018 | Duisenberg | G06F 3/0622 |
| 2018/0191666 A1* | 7/2018 | Rahman | H04L 61/1511 |
| 2019/0075149 A1* | 3/2019 | Lu | H04L 67/42 |

OTHER PUBLICATIONS

Internet Assigned Number Authority; RESTful Environments (CoRE) Parameters; 06-080-2012; pp. 1-40 (Year: 2012).*

W3C; Web of Things (WoT) Thing Description; Sep. 14, 2017; pp. 1-19 (Year: 2017).*

European Office Action dated Feb. 2, 2022 for European Patent Application No. 18719073.1, 9 pages.

Shelby, Z. et al., "CoRE Resource Directory," Internet Engineering Task Force (IETF), Internet Society (ISOC), No. 12, dated Oct. 30, 2017, expires May 3, 2018, 64 pages.

International Search Report and Written Opinion of the International Searching Authority, PCT/EP2018/058870, dated Nov. 27, 2018, 11 pages.

Hartke, K., Universitaet Bremen TZI, "Thing-to-Thing Data Hub," Thing-to-Thing Research Group, Nov. 13, 2016, 13 pages.

Hartke, K., Universitaet Bremen TZI, "CoRE Lighting," Thing-to-Thing Research Group, Sep. 14, 2015, 20 pages.

Shelby, Z. et al., "CoRE Resource Directory," CoRE, accessed on the Internet at: https://tools.ietf.org/html/draft-ietf-core-resource-directory-11, 53 pages.

Web of Things Interest Group, accessed on the Internet at: http://w3c.github.io/wot/current-practices/wot-practices.html#td-examples, 8 pages.

Shelby, Z., "Constrained RESTful Environments (CoRE) Link Format," Internet Engineering Task Force (IETF), Aug. 2012, 12 pages.

Web of Things (WoT) Thing Description, accessed on the Internet at: https://w3c.github.io/wot-thing-description/, 15 pages.

* cited by examiner

```
{
"@context": [
"https://w3c.github.io/wot/w3c-wot-td-context.jsonld",
"https://w3c.github.io/wot/w3c-wot-common-
context.jsonld"],
"@type": ["Temperature"],
"name": "temperatureSensor",
"interaction": [
{
"@type": ["Property", "Temperature"],
   "name": "Temperature",
   "outputData": {
     "type": "number"
   },
   "link": [
    {
      "href" : "coap://10.0.0.23:5000/getTemperature",
      "mediaType": "application/json"
    }]
}]
}
```
— 802

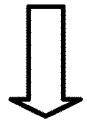

```
POST coap://rd.example.com/rd?ep= temperatureSensor
Content-Format: 40
Payload:
</ getTemperature >;ct=41;rt="Temperature";  anchor=" coap://10.0.0.23:5000"
```
— 804

THING DESCRIPTION TO RESOURCE DIRECTORY MAPPING

CROSS-REFERENCE TO RELATED APPLICATIONS

This application is a 35 U.S.C. § 371 national stage application of PCT International Application No. PCT/EP2018/058870 filed on Apr. 6, 2018, the disclosure and content of which is incorporated by reference herein in its entirety.

TECHNICAL FIELD

The inventive concepts described herein relate to Internet of Things (IoT) devices, and in particular to registration of available resources in an IoT environment using a Resource Directory.

BACKGROUND

An Internet of Things (IoT) device may include one or more sensors that can be used to provide measurements of one or more quantities, such as environmental variables (e.g., temperature, humidity, ambient light, carbon monoxide levels, etc.), network variables (e.g., memory utilization, energy consumption, processor utilization etc.), or other measurable quantities, and transmit the measurements as data over a network to a network node that requests the data. As used herein, a "network node" or "node", refers to any endpoint or device that has an address on a communication network, including, for example, a server, a client device, an IoT device, a sensor, an actuator, etc.

Referring to FIG. 1, an IoT environment 100 is illustrated. The IoT environment 100 generally includes one or more IoT devices 20 that may each include one or more sensors, such as temperature sensors, humidity sensors, light sensors, water sensors, etc. The IoT devices 20 are connected to a data communication network 25, which may include one or more of a wireless data communication network, a wired network, a local area network (LAN), a wide area network (WAN), and/or any other data communication network. Thus, an "IoT environment" refers to any network environment including IoT devices that communicate with one another. The IoT environment may be further defined or limited based on a common protocol by which the devices communicate, a security layer or protocol utilized by devices on the network, and/or other factors, such as a defined geographical area or functionality, or any other characteristic.

A client device 15 that needs to obtain data, e.g., temperature data, that can be provided by an IoT device 20 may send a request through the network 25 to one of the IoT devices 20 asking for the IoT device 20 to take a measurement of the requested data and provide the measured data to the client device 15. However, this assumes that the client device 15 knows the network address of an IoT device 20 that is suitably configured to measure the desired data and that is currently available to take the measurement and report the data to the client device 15.

One problem faced by the client device 15 is that an IoT environment 100 may be highly variable, as IoT devices 20 may come online or go offline from time to time, such as when they transition into or out of sleep mode. To determine what IoT devices are currently available to provide a desired service, a client device 15 may conduct a process to discover which resources are currently available on the IoT network.

IoT devices are often considered "constrained" devices (or constrained nodes), as they may have limited resources in terms of processing power, memory, battery lifetime, bandwidth, etc. The Internet Engineering Task Force (IETF), which is a standard setting organization, has defined a new communication protocol suitable for constrained nodes (e.g., 8-bit microcontrollers with limited memory) called Constrained Application (CoAP) protocol and described in IETF RFC 7252, a new constrained wireless personal area network called IPv6 over Low-Power Wireless Personal Area Networks (6LoWPANs) and described in IETF RFC 4919, and a new link format called CoRE Link Format described in IETF RFC 6690, among others.

The discovery of resources hosted by a constrained node is important in machine-to-machine applications where static interfaces may result in fragility. The discovery of resources hosted by a constrained node, their attributes, and other resource relations, is standardized in the IETF document draft-ietf-core-resource-directory and is referred to as "Resource Discovery."

The main function of the Resource Discovery mechanism is to provide Universal Resource Identifiers (URIs, called links) for the resources hosted by the node, complemented by attributes about those resources and possible further link relations. A well-known relative URI "/.well-known/core" is defined as a default entry point for requesting the list of links about resources hosted by an IoT device and thus performing Resource Discovery.

In many IoT environments, however, direct discovery of resources from constrained nodes, such as by directly querying known IoT devices using the relative URI "/.well-known/core", may not be practical due to sleeping nodes or when a network does not support multicast traffic. This problem can be addressed by employing an entity called a Resource Directory 10 on the network 25. Each IoT device 20 on the network 25 may register its presence and capabilities in the Resource Directory 10. A client device can discover whether a particular type of IoT resource is available on the network 25 by querying the Resource Directory 10. However, for the Resource Directory 10 to be useful as a resource discovery tool, it is important that the Resource Directory 10 maintain accurate and up-to-date information about what IoT devices 20 are available on the network 25 and what resources are available on those devices.

On the other hand, the world wide web consortium (W3C) standardization fora defines a meta-data format called a "Thing Description" (TD) that describes interactions provided by the IoT device. Thing Description files can be serialized in different formats such as the extensible markup language (XML) format. Each IoT device may have a unique Thing Description file that describes the interface that can be used by other devices to access the information of such IoT device. The Thing Description file associated with an IoT device may be shared by the IoT device with other devices upon request to facilitate interaction with the IoT device or can be stored in a third party server.

SUMMARY

A method according to some embodiments includes providing a Thing Description file for an Internet of Things, IoT, device, the Thing Description file including information describing a resource provided by the IoT device, mapping the Thing Description file to a Resource Directory registration command, and transmitting the Resource Directory registration command to a Resource Directory to register the resource in the Resource Directory.

Mapping the Thing Description file to the Resource Directory registration command may include constructing a POST request including a request command string and a payload, parsing the Thing Description file to obtain a resource name of a resource described by the Thing Description file, and providing the resource name as an end point, ep, parameter in the request command string of the POST request.

The method may further include obtaining a uniform resource identifier, URI, associated with the resource from a base field in the Thing Description file, and providing the URI as a context, con, parameter in the request command string of the POST request.

Mapping the Thing Description file to the Resource Directory registration command may further include parsing the Thing Description file to obtain a name of an interaction associated with the resource, a hyperlink associated with the interaction, and a media type associated with the hyperlink, and providing the name of the interaction, the hyperlink and the media type in the payload of the POST request.

Providing the name of the interaction, the hyperlink and the media type in the payload of the POST request may include parsing the hyperlink to obtain a pathname and a target, and converting the media type to a media type number.

The payload of the POST request may include the target obtained from the hyperlink, a content type, ct, field including the media type number, a resource type, rt, field including the name of the interaction, and an anchor field including the pathname obtained from the hyperlink.

Mapping the Thing Description file to the Resource Directory registration command may further include parsing the Thing Description file to obtain a plurality of resources.

Providing the names of the interactions, the hyperlinks and the media types in the payload of the POST request may include parsing the hyperlinks to provide respective pathnames and targets, and converting the media types to respective media type numbers.

The payload of the POST request may include for each of the plurality of interactions an opening tag including the target obtained from the hyperlink of the respective interaction, a content type, ct, field including the media type number of the respective interaction, a resource type, rt, field including the name of the respective interaction, and an anchor field including the pathname obtained from the hyperlink of the respective interaction.

The Thing Description file may be serialized in a JavaScript object notation (JSON) format, and the payload of the operations of the Resource Directory may be serialized in a CoRE Link Format.

Some further embodiments provide an Internet of Things, IoT, device adapted to provide a Thing Description file for the IoT device, the Thing Description file including a formatted record describing a resource provided by the IoT device, map the Thing Description file to a Resource Directory registration command, and send the Resource Directory registration command to a Resource Directory to register the resource in the Resource Directory.

Some further embodiments provide a computing device adapted to provide a Thing Description file for an IoT device, the Thing Description file including a formatted record describing a resource provided by the IoT device, map the Thing Description file to a Resource Directory registration command, and send the Resource Directory registration command to a Resource Directory to register the resource or resources in the Resource Directory.

Still further embodiments provide a computer program product including a non-transitory computer readable storage medium having computer readable program code embodied in the medium, the computer readable program code comprising computer readable program code configured to provide a Thing Description file for an IoT device, the Thing Description file including a formatted record describing a resource provided by the IoT device, map the Thing Description file to a Resource Directory registration command, and send the Resource Directory registration command to a Resource Directory to register the resource or resources in the Resource Directory.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

The accompanying drawings, which are included to provide a further understanding of the invention and are incorporated in and constitute a part of this application, illustrate certain embodiment(s) of the invention. In the drawings:

FIG. 8 illustrates mapping of a Thing Description file to a Resource Directory registration command according to some embodiments.

DETAILED DESCRIPTION OF EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As noted above, the discovery of resources offered by a constrained IoT device is important in IoT environments. The IETF has defined an entity called "Resource Directory"

that may be present in an IoT environment. A Resource Directory can be used to assist in the process of resource discovery in an IoT environment. A client device that seeks to obtain data from an IoT device can query the Resource Directory to identify available resources in the environment. The Resource Directory interface is provided using the Core Link Format specified by IETF RFC 6690.

From the standpoint of an IoT device, the world wide web consortium (W3C), defines a meta-data format, called a "Thing Description" (TD), that describes interactions provided by the IoT device. In other words, a Thing Description file is a data file that uses the extensible markup language (XML) to describe the interfaces of a particular IoT device to other devices, such as IoT devices, client devices, servers, etc. Each IoT device may have a unique Thing Description file that describes the resources provided by the IoT device and the interfaces that can be used to access those resources. The TD file associated with an IoT device may be shared by the IoT device with other devices upon request to facilitate interaction with the IoT device.

Figure 1:
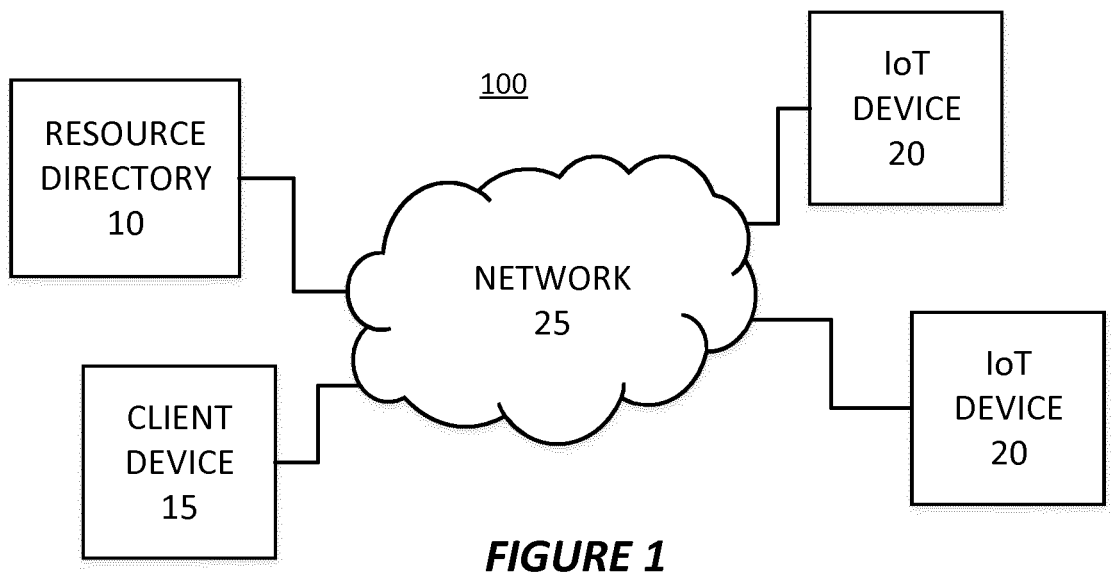
FIG. 1 illustrates a network environment including a plurality of Internet of Things (IoT) devices.
Figure 2A:
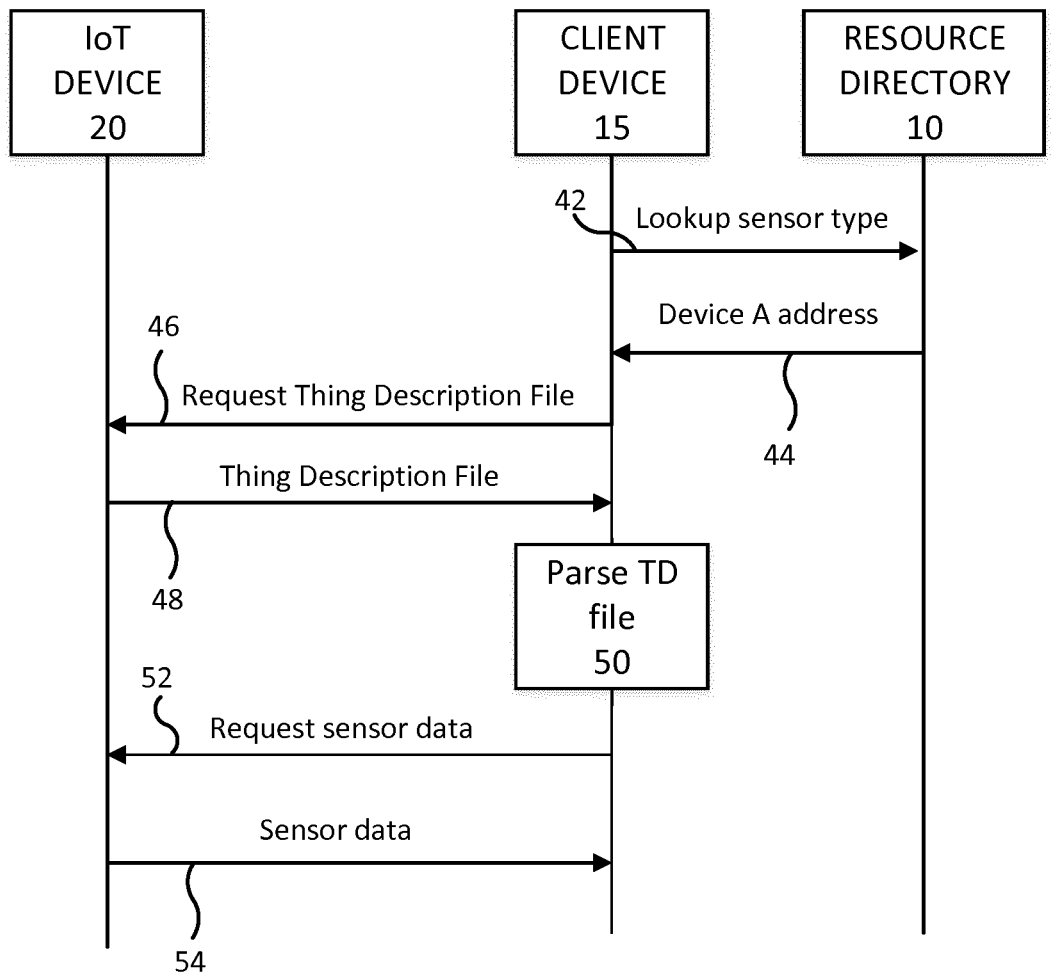
FIG. 2A illustrates discovery of resources of an IoT device by a client device using a Resource Directory.

The Resource Directory framework provided by the IETF and the Thing Description format provided by W3C may operate together to enable efficient resource discovery in an IoT environment. A client device that seeks to obtain services from an IoT device can query the Resource Directory to obtain basic information about IoT devices in the environment. Using this information, the client device can obtain a Thing Description file from an IoT device. The client device can use information in the Thing Description file to interact with the IoT device. FIG. 2 is a flow diagram that illustrates an example of such an interaction. Referring to FIG. 2A, a client device 15 seeks to obtain information that can be provided by an IoT device 20. For example, the client device 15 may seek to obtain temperature information from an IoT device. The client device 15 may be any type of computing device, such as mobile terminal, a server, or even another IoT device, that is capable of communicating with devices in an IoT environment. Accordingly, a "client device" refers to any device that seeks to obtain services from an IoT device in an IoT environment. To discover what resources are available in the IoT environment to provide the desired data, the client device 15 sends a lookup request 42 to the Resource Directory 10. The lookup request 42 may specify a particular sensor type that the client device 15 wants to obtain data from. For example, the client device 15 may want to know which resources of type "temperature" are available in the IoT environment. The lookup request 42 asks the Resource Directory 10 to provide a list of the available temperature devices in the environment.

In response to the lookup request 42, the Resource Directory 10 provides a response 44 to the client device 15 including a list of the devices in the network that have resources of the type "temperature." In particular, the response 44 of the Resource Directory 10 may include a network address of the IoT device 20, which has been registered with the Resource Directory as providing resources of type "temperature." The network address provided in the response 44 may, for example, include a uniform resource identifier (URI) associated with the IoT device 20.

Once the client device 15 has the URI of the IoT device 20, the client device 15 may send a request message 46 to the IoT device 20 requesting the Thing Description (TD) file of the IoT device 20. The IoT device 20 responds to the client device 15 with a message 48 including its TD file. As noted above, the TD file may include an XML-formatted data file. The client device 15 parses the TD file at block 50 to determine how to access the temperature information provided by the IoT device 20. For example, the TD file may inform the client device 15 that the temperature measurement of the IoT device 20 can be accessed using a 'GET' operation using the Constrained Application Protocol (CoAP) with the URI schema 'getTemperature( )', and that the temperature will be returned in the payload of the response with a defined format.

Once the client device 15 has parsed the TD file, the client device 15 knows how to access the temperature information of the IoT device 20. The client device 15 may then send a request message 52 to the IoT device 20 requesting temperature data, and the IoT device 20 may send back a response 54 containing the data in the predefined format.

As long as the resources that can be provided by the IoT device 20 remain static and in accordance to the information registered in the Resource Directory 10, this interaction between the IETF and the W3C frameworks works well. However, a problem can arise due to the fact that the resources an IoT device can provide may change dynamically. For example, an IoT device 20 can add a new resource, such as a new "Humidity" resource in addition to its previously provided "Temperature" resource. If that happens, the Thing Description file associated with the IoT device 20 must be changed accordingly to show the new operations associated with the Humidity resource. In addition, the new resource must be registered into the Resource Directory 10 to make it discoverable by client devices. As currently implemented, the modification of the registration operation in an IoT device must be performed manually. That is, a user must manually code the new registration operation into the IoT device. Such actions can be error-prone and, when a large number of devices are involved, impractical or effectively infeasible. This work is very laborious and may require re-compiling the new code in an IoT device. That is a task that normal users cannot perform by themselves.

Embodiments of the inventive concepts provide systems and/or methods that automatically map the information contained in an updated Thing Description file to a registration command for registering the new resources in a Resource Directory. Thus, when a new resource is added into an IoT device and a new Thing Description file is provided to describe the new resource, a computing device, such as an IoT device, a server or other device, can automatically process the new Thing Description file and translate it into a Resource Directory registration operation. Using the systems/methods described herein, the integration of a new Thing Description into an IoT environment is feasible and can be done easily through a REST operation.

Figure 2B:
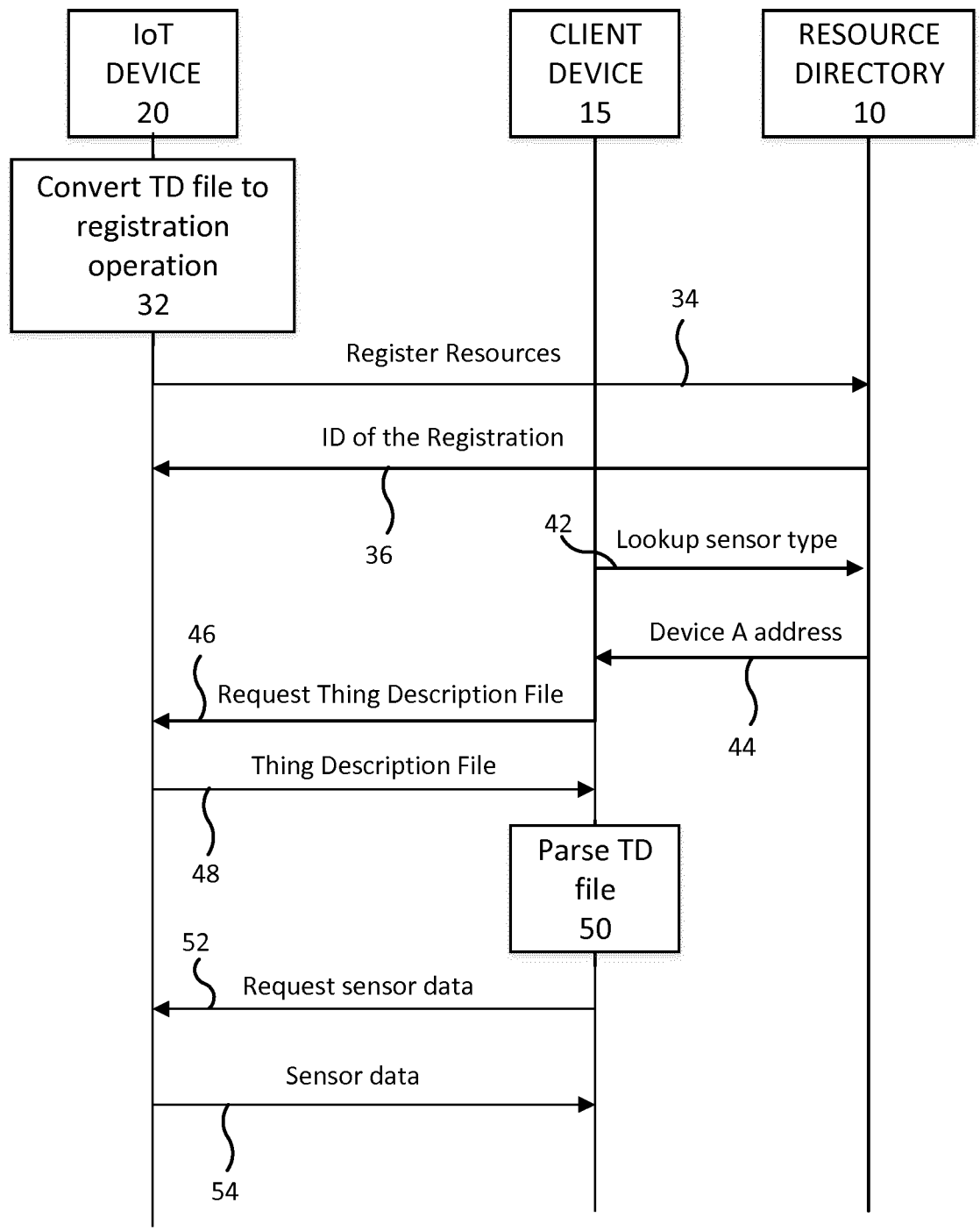
FIG. 2B illustrates a registration operation by an IoT device according to some embodiments followed by discovery of resources of the IoT device by a client device.

FIG. 2B illustrates a registration operation by an IoT device according to some embodiments followed by discovery of resources of the IoT device by a client device. As shown therein, before discovery of the resources of an IoT device 20, the IoT device 20 first automatically converts a Thing Description file to a registration operation in block 32. The IoT device 20 then registers its resources with the Resource Directory 10 in an operation 34. The Resource Directory executes the registration operation to register the resources of the IoT device 20 and responds with the ID of the registration in a message 36 to the IoT device 20. The remaining operations in FIG. 2B are similar to those shown in FIG. 2A.

Systems/methods according to some embodiments may help to reduce errors in the resource discovery process and enable automation of the updating of IoT devices. Some of the advantages of the inventive concepts include automatic mapping of TD files to resource registration commands for registering the resources into a Resource Directory. Because the mapping is performed automatically, the process may reduce errors. However, because Thing Description files are human-readable, the Thing Description files can be updated manually.

Figure 3:
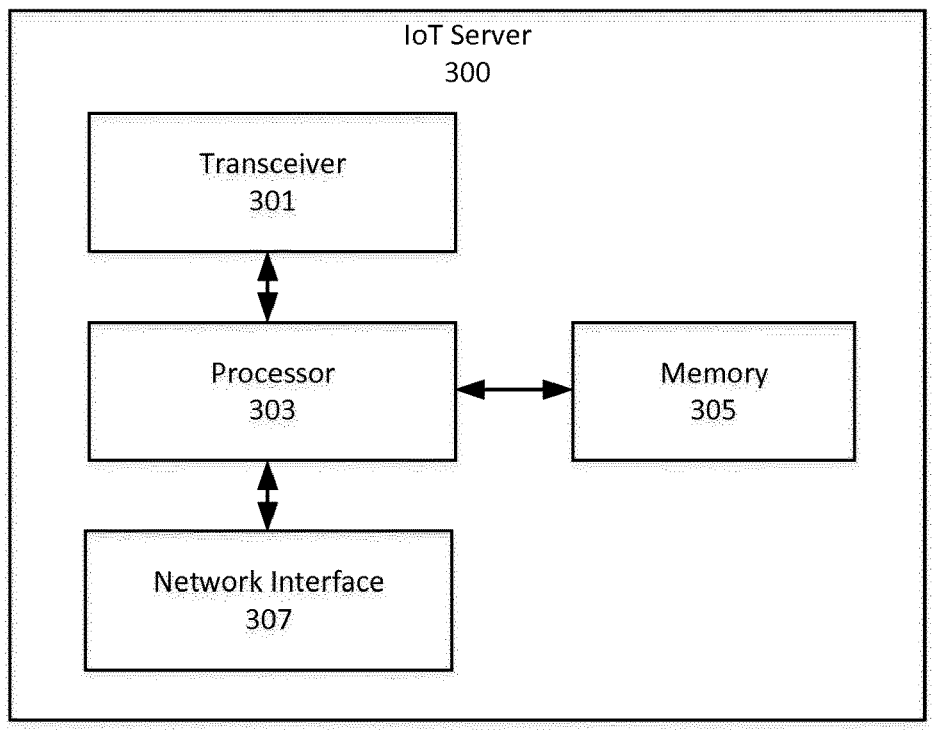
FIG. 3 is a block diagram illustrating an IoT server according to some embodiments.

FIG. 3 is a block diagram illustrating elements of an IoT server 300 that may be configured to perform operations according to some embodiments. As shown, an IoT server 300 may include a transceiver 301 configured to provide communications with a plurality of wireless devices over a network 25, a network interface 307 configured to provide communications with other servers or computing devices, and a processor 303 coupled to the transceiver and the network interface, and a memory 305 coupled to the processor. The memory 305 may include computer readable program code that when executed by the processor 303 causes the processor 303 to perform operations according to embodiments disclosed herein. According to other embodiments, processor 303 may be defined to include memory so that a memory 305 may not separately provided.

Figure 4:
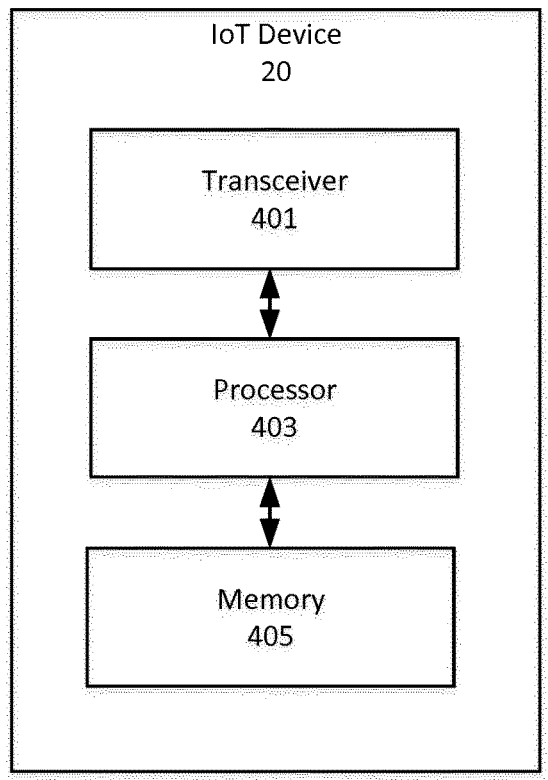
FIG. 4 is a block diagram illustrating an IoT device according to some embodiments.

FIG. 4 is a block diagram illustrating elements of an IoT device 20 that may be configured to perform operations according to some embodiments. As shown, an IoT device 20 may include a transceiver 401 configured to provide communications with other devices/nodes over a network 25, a processor 403 coupled to the transceiver 401, and a memory 405 coupled to the processor 403. The memory 405 may include computer readable program code that when executed by the processor 403 causes the processor 403 to perform operations according to embodiments disclosed herein. According to other embodiments, the processor 403 may be defined to include a memory so that the memory 405 may not be separately provided.

Figure 5:
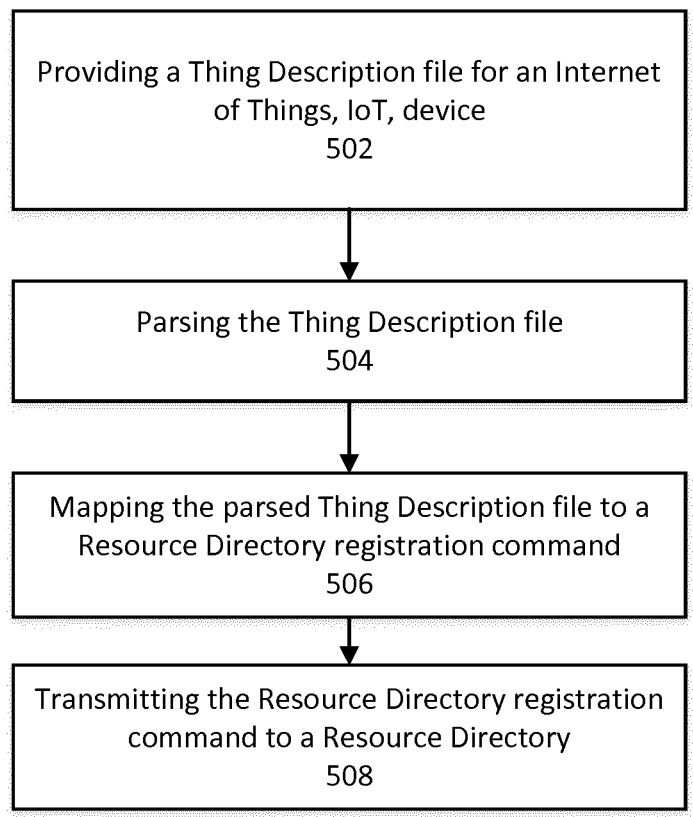
FIG. 5 is a flowchart illustrating operations of devices/methods according to some embodiments.

Systems/methods according to some embodiments are illustrated in the flowchart of FIG. 5. Operations illustrated in FIG. 5 may be performed by a suitably configured IoT device 20 that provides IoT resources to the network and/or by a separate server device 300 that is distinct from the IoT device that provides the IoT resources. Referring to FIG. 5, the operations include providing a Thing Description file for an IoT device (block 502). As described in more detail below, the Thing Description file is a formatted record that describes a resource provided by the IoT device. Next, systems/methods parse the TD file to obtain its constituent parts (block 504), and then map the TD file to a Resource Directory registration command (block 506). Some examples of parsing the TD file and mapping the TD file to a Resource Directory registration command are provided below. Finally, the systems/methods transmit the Resource Directory registration command to a Resource Directory 20 to register the resource or resources in the Resource Directory 20 (block 508).

Figure 6A:
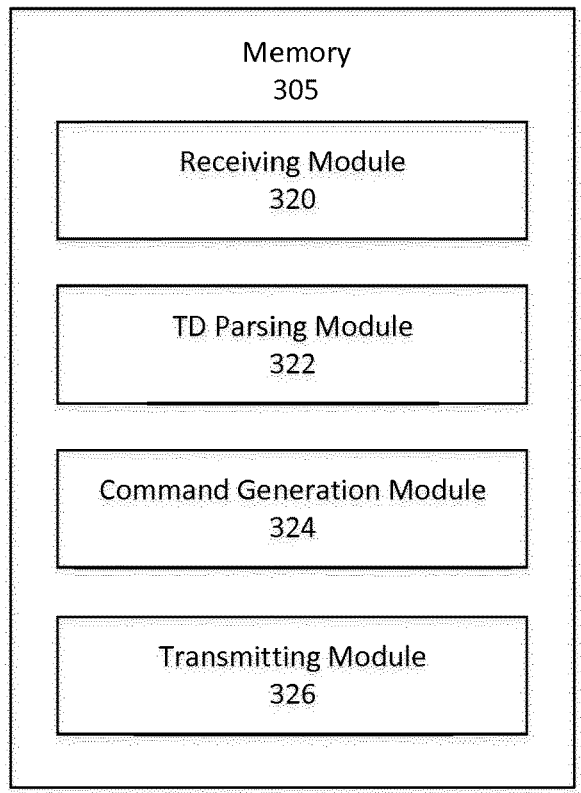
FIG. 6A is a block diagram illustrating functional modules of an IoT server according to some embodiments.
Figure 6B:
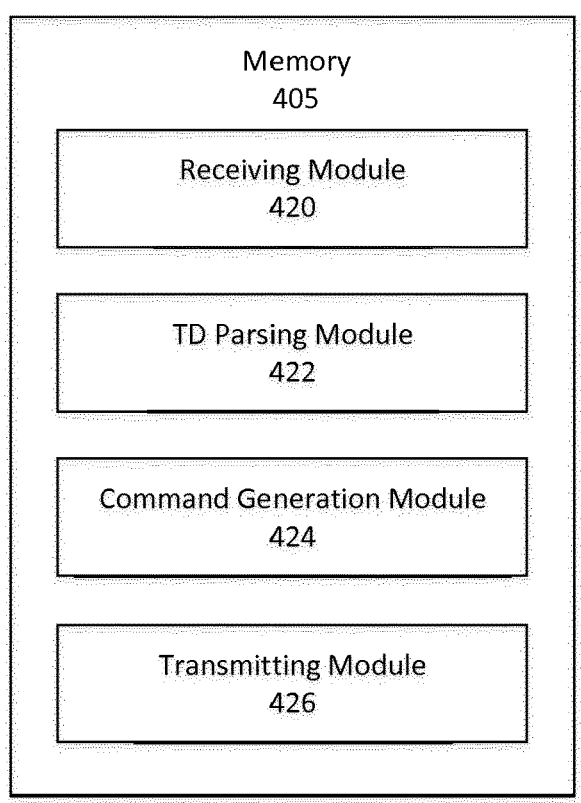
FIG. 6B is a block diagram illustrating functional modules of an IoT device according to some embodiments.

FIG. 6A is a block diagram illustrating various functional modules that may be provided in a memory 305 of an IoT server 300 (FIG. 3). As shown therein, memory 305 of the IoT server 300 may include a receiving module 320 that receives updated resource information, which may be in the form of a TD file, a Thing Description parsing module 322 that parses a TD file containing updated resource information, a command generation module 324 that generates a Resource Directory registration command, and a transmitting module 326 that sends the Resource Directory registration command to a Resource Directory. FIG. 6B is a block diagram illustrating various functional modules that may be provided in a memory 405 of an IoT device 20 (FIG. 4). As shown therein, the memory 405 of the IoT device 20 may include a receiving module 420 that receives updated resource information for the IoT device, which may be in the form of a TD file, a Thing Description parsing module 422 that parses a TD file containing updated resource information, a command generation module 424 that generates a Resource Directory registration command, and a transmitting module 426 that sends the Resource Directory registration command to a Resource Directory.

Embodiments of the inventive concepts provide systems/methods that fetch and interpret information about IoT resources from a Thing Description file. The format of a Thing Description file has been established by the W3C standards organization and describes the data and interfaces of an IoT device.

A registration command for a Resource Directory will now be described.

The Resource Directory implements an interface that enables an IoT device of a network register its resources. In that way, other nodes from the same network can query the different IoT resources in a network. That interface includes registering resources, updating resources and/or deleting resources from the Resource Directory. In addition, the interface has a lookup operation to query the resources of a network.

A registration operation accepts a POST command from an endpoint, or node, containing a list of resources to be added to the Resource Directory as the message payload. As used herein, a "registration operation" may include a new registration operation in which a new registration is created in the Resource Directory or an update registration operation in which an existing registration in the Resource Directory is updated. A "registration command" includes a command to create a new registration in a Resource Directory or to update an existing registration in a Resource Directory.

The following example in Table 1 shows a registration request ("Req") and the associated response ("Res") for registering two resources (a temperature sensor and a light sensor) for an IoT device with the name "node1" in a Resource Directory using the provided registration interface. In response to the command, the Resource Directory returns the identifier of the registration to the IoT device. Later, the IoT Device can use that identifier to update or delete the registration from the Resource Directory.

TABLE 1

| Example Registration Request and Response |
| --- |
| Req: POST coap://rd.example.com/rd?ep=node1<br>   Content-Format: 40<br>   Payload:<br>      </sensors/temp>;ct=41;rt="temperature-c";if="sensor";<br>anchor="coap://spurious.example.com:5683",<br>      </sensors/light>;ct=41;rt="light-lux";if="sensor"<br>   Res: 2.01 Created<br>   Location: /rd/4521 |

As shown in Table 1, the registration request (or registration command) includes a command ("POST") followed by a request command string, a content format and a payload. The POST command may be transmitted using the CoAP protocol as shown in Table 1 or using another protocol, such as the HTTP protocol. The command string includes a Resource Directory registration URI, which is a URI of the Resource Directory that is being updated ("coap://rd.example.com/rd") followed by a command parameter string ("?ep=node1"). The command parameter string includes one or more variables or parameters, including a mandatory endpoint ("ep=") parameter that identifies the node whose Resource Directory entry is being modified. Various optional command parameters may be provided in the command parameter string, including a context ("con=") parameter that refers to a scheme, address, port and base path of the owner of the resources ("con=" is used if the resources are registering by a third-party node), an endpoint type ("et=") parameter that defines the semantic type of the node, a domain ("d=") parameter that identifies the domain to which the node belongs, and a lifetime ("lt=") parameter that defines the lifetime of the registration in seconds. Lifetime refers to the time that a registration is valid in the Resource Directory. If not specified, the Resource Directory assumes a lifetime of 86400 seconds (24 hours). The POST command also includes a Content-Format field, which is a numerical content format identifier (in this example, "Content-Format: 40") and specifies the payload serialization.

The payload of the registration command provides information needed to create or update the Resource Directory entry for the device identified in the endpoint (ep) parameter. In this example, a resource of type "temperature-c" is associated with a URI target of "/sensors/temp" which is enclosed in braces "<>" at the start of the entry. The payload includes a content type attribute ("ct=41") that is a numerical content type indicator, a resource type attribute ("rt='temperature-c") that indicates the type of resource that is provided by the target, an anchor attribute ("anchor='coap://spurious.example.com:5683'") that provides a URI associated with the target, and an interface type attribute ("if='sensor'") that provides a name or URI indicating a specific interface definition used to interact with the target resource.

In the example shown in Table 1, the payload of the registration request also includes a second entry for a resource of type "light-lux." This resource is associated with a URI target of "/sensors/light" having a content type attribute ("ct=41") and a resource type attribute ("rt='light-lux'") and an interface type attribute ("if='sensor'").

When the request has been successfully processed, the Resource Directory returns a response indicating that the resource has been created and providing the name/location of the record at the Resource Directory ("Location: /rd/4521").

The content type ("ct=") attribute in the registration request corresponds to a media type string according to Table 2, below.

TABLE 2

Media Type to Content Type Mapping

| Media type (string) | Content type (integer) |
|---|---|
| text/plain | 0 |
| application/xml | 41 |
| application/exi | 47 |
| application/json | 50 |

If no lifetime parameter ("lt=") is included in the registration request, a default value of 86400 seconds (24 hours) is assumed by the Resource Directory, meaning that the registration will be deleted after 24 hours.

Table 3 illustrates an example of a registration request that registers two resources (temperature and light) for a period of 48 hours (172800 seconds). The Resource Directory returns a different identifier ("/rd/4522") for that registration:

TABLE 3

Example Registration Request and Response

Req: POST coap://rd.example.com/rd?ep=node2<=172800
    Content-Format: 40
    Payload:
    </sensors/temp>;ct=41;rt="temperature-c";if="sensor";
    </sensors/light>;ct=41;rt="light-lux";if="sensor"
    Res: 2.01 Created
    Location: /rd/4522

In addition to creating a registration, a node can update a previous registration. The example shown in Table 4 below illustrates how registration update can be performed using the Resource Directory interface. In the example shown in Table 4, the registration of the previous example registration operation is updated.

TABLE 4

Example Registration Update Request and Response

Req: POST coap://rd.example.com/rd/4522
    Content-Format: 40
    Payload:
    </sensors/temp>;ct=41;rt="temperature-c";if="sensor";
    Res: 2.04 Changed In the example shown in Table 4, the node updates its registration to remove the "light" resource. Note that the node uses the identifier "/rd/4522" provided by the Resource Directory in the registration interface in the RD command URI to identify the resource that is being updated.

In some cases, even generating and transmitting a simple registration command may be too taxing for some very constrained devices, in particular if the security requirements become too onerous. Thus, the Resource Directory request can be fulfilled by a third device. For that purpose, the scheme, IP address and port of the registered device may be indicated using the Context parameter ("con=") in the registration request. The example shown in Table 5 below illustrates a command issued by a third-party device to register another device:

TABLE 5

Example Registration Request and
Response using Context parameter

Req: POST coap://rd.example.com/rd?ep=node1&con=10.0.0.0:5000
    Content-Format: 40
    Payload:
    </sensors/temp>;ct=41;rt="temperature-c";if="sensor";
anchor="coap://spurious.example.com:5683",
    </sensors/light>;ct=41;rt="light-lux";if="sensor"
    Res: 2.01 Created
    Location: /rd/4523

Figure 7A:
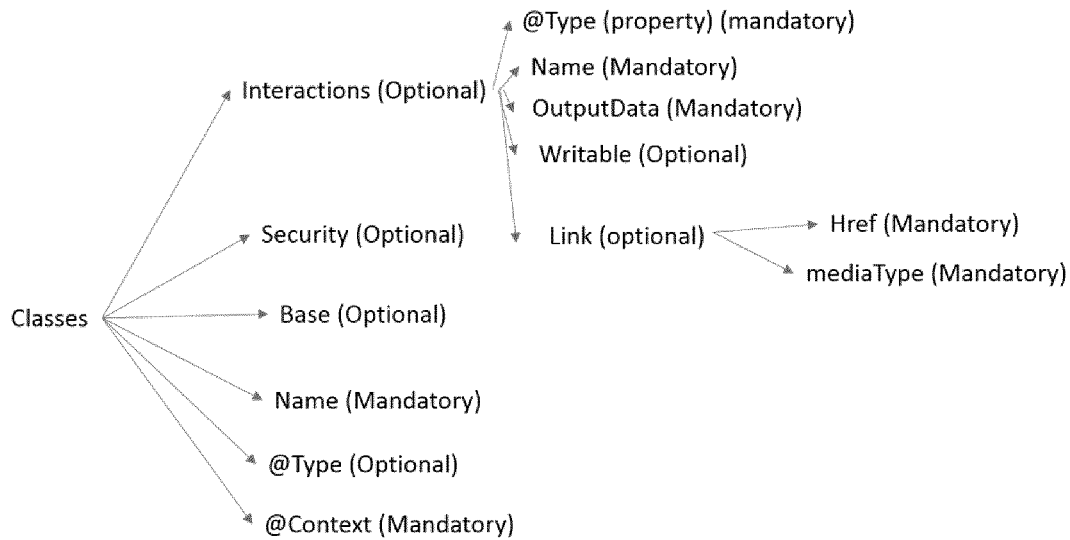
FIGS. 7A, 7B and 7C illustrate components of a Thing Description file.
Figure 7B:
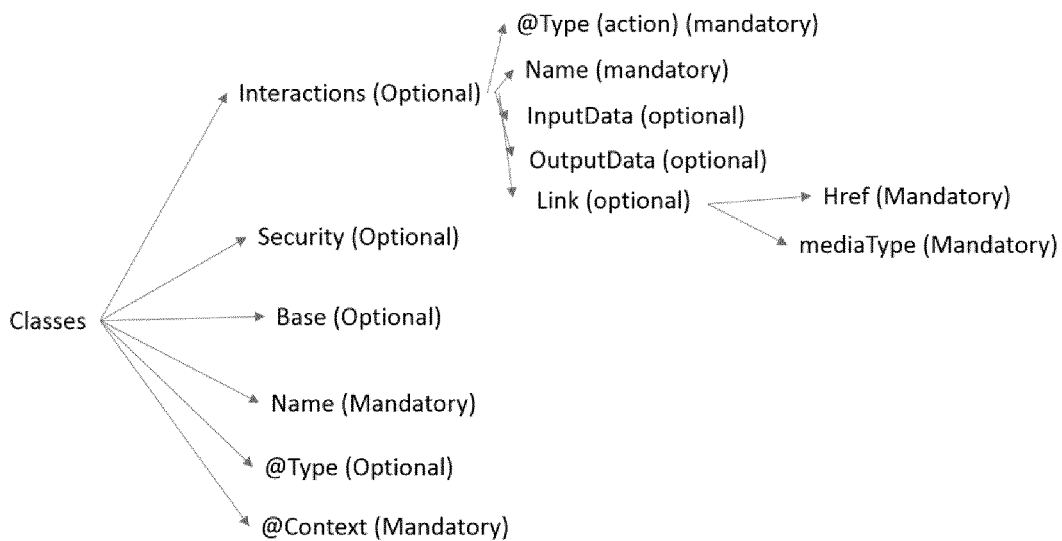
Figure 7C:
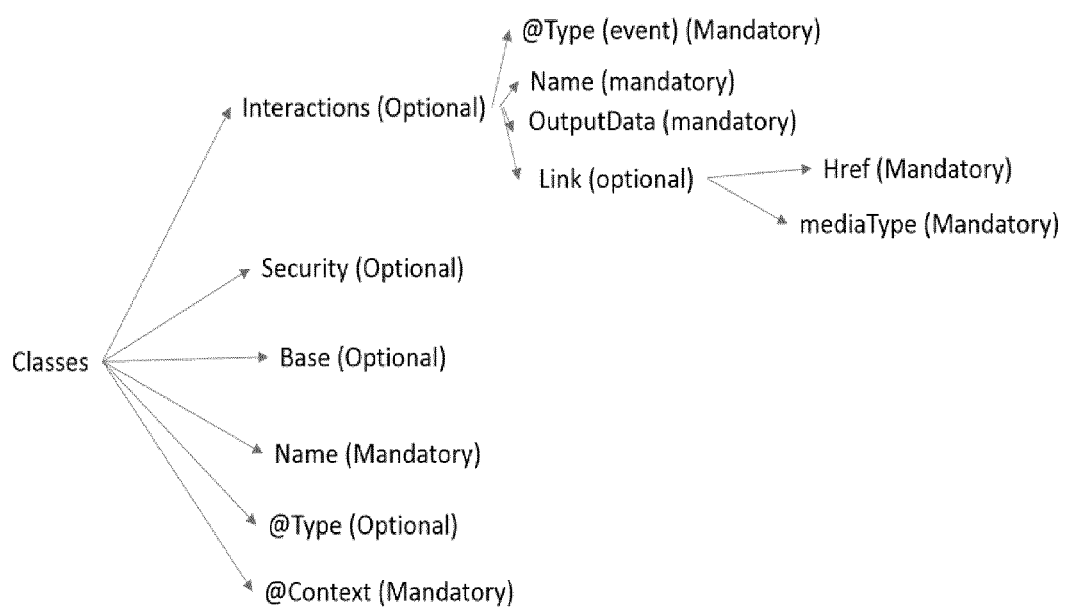

A Thing Description file will now be described. The structure of a Thing Description file is illustrated in FIGS. 7A, 7B and 7C. A Thing Description file describes the different interactions that an IoT device can perform. The Thing Description file may be serialized in JavaScript object notation (JSON) format as specified by the W3C standards organization. The different operations are divided in three types: properties, action and events operations, the structure of which is illustrated in FIGS. 7A, 7B and 7C, respectively. The Thing Description refers to these operations as interactions. The Thing Description vocabulary varies based on the interaction field, meaning that an interaction field of type "property" will have a vocabulary different than an interaction field of type "action" or "event". FIGS. 7A, 7B and 7C show the various possibilities for each interaction type, and also show which fields are mandatory and which are optional.

As shown in FIGS. 7A, 7B and 7C, the interaction field is optional. However, if an interaction field is added into the Thing Description, its mandatory subfields must also be included depending of the type of interaction.

Referring still to FIGS. 7A, 7B and 7C, each Thing Description file includes a number of classes, including Interactions, Security, Base, Name, @Context and @Type. The Interactions class has a number of sub-classes, including @Type, Name, Observable, InputData, OutputData, Writable and Link. The Link sub-class includes an href field that contains a uniform resource identifier (URI) associated with the interaction and a mediaType field that describes a media type provided at the URI.

The @Type sub-class of the Interactions class may include a property, action or event. The interactions of type property provide the readable and/or writeable data of the IoT devices. The interactions of type action trigger changes or processes on an IoT device that take a certain time to complete. The interactions of type event enable a mechanism for event-based notification by a Thing based on a triggering condition. The three interactions can provide a name to the operations and define the input or output data.

The base field of the Thing Description provides a base URL used to construct the URL of each interaction. The Interaction field includes sub-fields of @type, name, inputData, outputData, writable and link depending on the type of interaction. The link sub-field includes href and mediaType sub-fields.

Table 6 below shows an example of a Thing Description file. The Thing Description file shown in Table 6 defines the interactions of a temperature sensor that is located at the URL coap://www.example.com:5683/temp/. It defines two interactions, a property interaction located in the URL coap://www.example.com:5683/temp/val and an event interaction located in the URL coap://www.example.com:5683/temp/val/changed. Note that the entire URL of the interactions is the URL of the base field concatenated with the information in the href field of the link associated with the interaction. For instance, the URL of the property interaction is base (coap://www.example.com:5683/temp/)+the href (val).

If the base field is not defined in the Thing Description, the entire URL of each interaction is defined in the href field of the link associated with the interaction.

TABLE 6

Example Thing Description

```
{
"@context": [
    "https://w3c.github.io/wot/w3c-wot-td-content.jsonId",
    "https://w3c.github.io/wot/w3c-wot-common-context.jsonId"],
"@type": ["Sensor"],
"name": "myTempSensor",
"base" : "coap://www.example.com:5683/temp/",
 "interaction": [
 {
        "@type": ["Property","Temperature"],
        "unit": "celsius",
        "name": "myTemp",
        "outputData": { "type": "number" },
        "writable": false,
    "link": [{
            "href" : "val",
            "mediaType": "application/json"
    }]
 },
 {
   "@type": ["Event", "Temperature"],
   "outputData": { "type": "number" },
    "name": "myChange",
   "property": "temp",
    "link": [{
            "href" : "val/changed",
            "mediaType": "application/json"
    }]
  } ]
}
```

Table 7 below shows another example of a Thing Description file. In the example shown in Table 7, a node has two resources (humidity and temperature) and other nodes can interact with this node through three different operations. Note that this Thing Description file does not have a base field. That means that the URLs of the different operations are defined for each interaction under the href field.

The first interaction is a property interaction of the temperature resource. The URL of that interaction is coap://www.example.com:5683/temp/val. The second interaction is a property interaction of the humidity resource. The URL of that interaction is coap://www.example.com:5683/hum/val. The third interaction is an event interaction of the temperature resource. The URL of that interaction is coap://www.example.com:5683/temp/val/changed.

TABLE 7

Example Thing Description

```
{
"@context": [
    "https://w3c.github.io/wot/w3c-wot-td-context.jsonId",
    "https://w3c.github.io/wot/w3c-wot-common-context.jsonId"],
"{@type": ["Sensor"],
"name": "myTempHumSensor",
"interaction": [
{
        "@type": ["Property","Temperature"],
        "unit": "celsius",
        "name": "myTemp",
        "outputData": { "type": "number" },
```

TABLE 7-continued

Example Thing Description

```
        "writable": false,
        "link": [{
                    "href" : coap://www.example.com:5683/temp/val",
                    "mediaType": "application/json"
        }]
    },
    {
  "{@type": ["Property", "Humidity"],
        "name": "status",
        "outputData": {"type": "string"},
      "writable": false,
            "link": [{
              "href" : coap://www.example.com:5683/hum/val",
                "mediaType": "application/json"
            }]
    },
    {
      "@type": ["Event", "Temperature"],
      "outputData": { "type": "number" },
      "name": "myChange",
      "property": "temp",
      "link": [{
                    "href" : " coap://www.example.com:5683 /temp/val/changed",
                    "mediaType": "application/json"
        }]
    } ]
}
```

FIG. 8 illustrates an example of mapping of a Thing Description file to a Resource Directory registration command according to some embodiments. In particular, an example of a Thing Description file 802 for an IoT device is shown in FIG. 8. The TD file 802 shown in FIG. 8 includes a @context field, a @type field, a name field, and an interaction field. In this example, the @Type of the TD entry is Temperature and the name of the device is temperatureSensor. The device has an interaction of type property that is called Temperature and that is output as an outputData type number. The interaction named Temperature can be accessed at the URI coap://10.0.0.23/getTemperature, which returns a mediaType application/json. The URI provided in the href sub-field of the link field associated with the interaction can be parsed into a pathname ("coap://10.0.0.23/") and a target ("getTemperature").

Systems/methods according to various embodiments provide a mechanism to automatically parse and translate a Thing Description file into a registration command that can be used to update a Resource Directory. The payload of the Resource Directory operation may be formatted in the constrained RESTful environment (CoRE) link format. An example of a registration command 804 that corresponds to the Thing Description file 802 is also illustrated in FIG. 8. The registration command 804 includes a command type ("POST") followed by a request command string and a payload. The command string includes a URI of the Resource Directory ("coap://rd.example.com/rd") followed by a command parameter string ("?ep=temperatureSensor"). Various command parameters may be provided in the command parameter string, including an endpoint ("ep=") parameter that identifies the device whose Resource Directory entry is being modified and a context ("con=") parameter. The POST command also includes a Content-Format field, which is a numerical content format identifier (in this example, "Content-Format: 40") and describes the serialization of the payload of the operation.

The payload of the registration command provides the updated resource information entry for the device identified in the endpoint parameter. In this example, a resource of type "Temperature" is associated with a target of "getTemperature" which is enclosed in angle brackets "< >" at the start of the entry. The payload includes a content type ("ct=") field that is a numerical content type indicator, a resource type ("rt=") field that indicates the type of resource that is provided by the target, and an anchor ("anchor=") field that provides a URI associated with the target.

Figure 9:
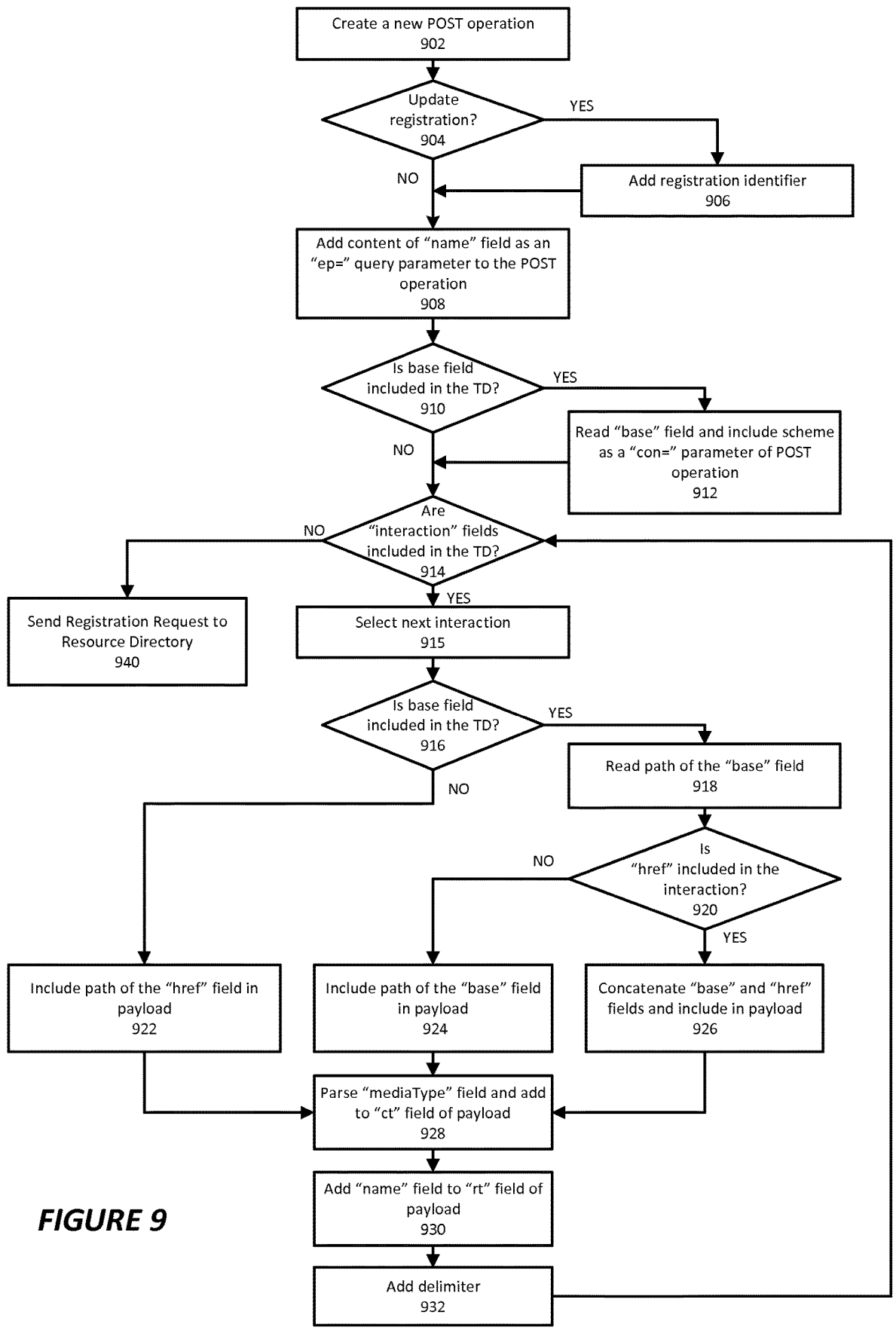
FIGS. 9 to 13 are flowcharts that illustrate operations of systems/methods according to some embodiments.

To generate the registration command The systems/methods implement the following operations:
Create a new POST operation:
 a. Read the name field from the Thing Description file and add it as a query parameter to the parameter string of the POST operation (ep=).
 b. Read the base field (if any) from the Thing Description file. Remove the pathname and add it as a query parameter to the parameter string of the POST operation (con=)
Create the payload of the POST operation:
 a. For all interaction items in the Thing Description file:
  i. For all links in the interaction:
   1. Create a new line in the payload.
   2. Read the href field. Add it to the payload between angle brackets (< >)
   3. Read mediaType field, parse it to a number and add it after the href field (ct=)
   4. Read name field. Add it after the mediaType (rt=)
   5. Read the pathname of the href (if any) and add it after the anchor field (anchor=)
  ii. Add delimiter Operations according to some embodiments are illustrated in FIG. 9. As shown therein, operations begin when the systems/methods create a new POST operation from a provided Thing Description (TD) (block 902). The systems/methods then check to see if the POST operation is intended to update an existing registration (block 904). If so, the systems/methods add a registration identifier to the URL of the POST command at block 906. That identifier was first generated and returned by the Resource Directory to the IoT client in a previous registration. If not, the systems/methods add the content of the name field of the Thing Description as an endpoint ("ep=") parameter of the POST request (block 908).

The systems/methods then check to see if a base field is included in the Thing Description (block 910). If so, the systems/methods read the contents of the base field and include the scheme [//host[:port]] as a context ("con=") parameter of the POST request.

Operations next proceed to block 914, where the systems/methods determine if there are any remaining interaction fields included in the Thing Description. If not, i.e. if all interaction fields in the Thing Description have already been processed, the systems/methods finalize the POST request and send it to the Resource Directory at block 940. Otherwise, operations proceed to block 915, where the systems/methods select the next interaction in the Thing Description and then check again at block 916 to see if the base field is included in the Thing Description. If not, operations proceed to block 922, where the systems/methods copy the path of the href field of the current interaction and add the result to the payload between angle brackets ("< >").

If the base field is determined at block 916 to be included in the TD, operations proceed to block 918, where the systems/methods read the path ("[/path]") of the base field in the TD. The systems/methods then check at block 920 to see if the href field is included in the link associated with the interaction. If so, operations proceed to block 926, where the systems/methods concatenate the URI from the base field with the path ("[/path]") from the href field of the link and add the result to the payload between angle brackets ("< >"). If the href field is not included in the link of the interaction, operations proceed to block 924, where the systems/methods copy the URI from the base field and add the result to the payload between angle brackets ("< >").

From blocks 922, 924 and 926, operations proceed to block 928, where the systems/methods parse the mediaType field of the Thing Description and add the results to the "ct=" field of the payload. The systems/methods then add the name field of the Thing Description to the "rt=" field of the payload (block 930). The systems/methods then end the current record with the appropriate delimiter, e.g., a comma, at block 932, and operations return to block 914, where the systems/methods check to see if there are any more interactions in the Thing Description file that need to be processed.

Figure 10:
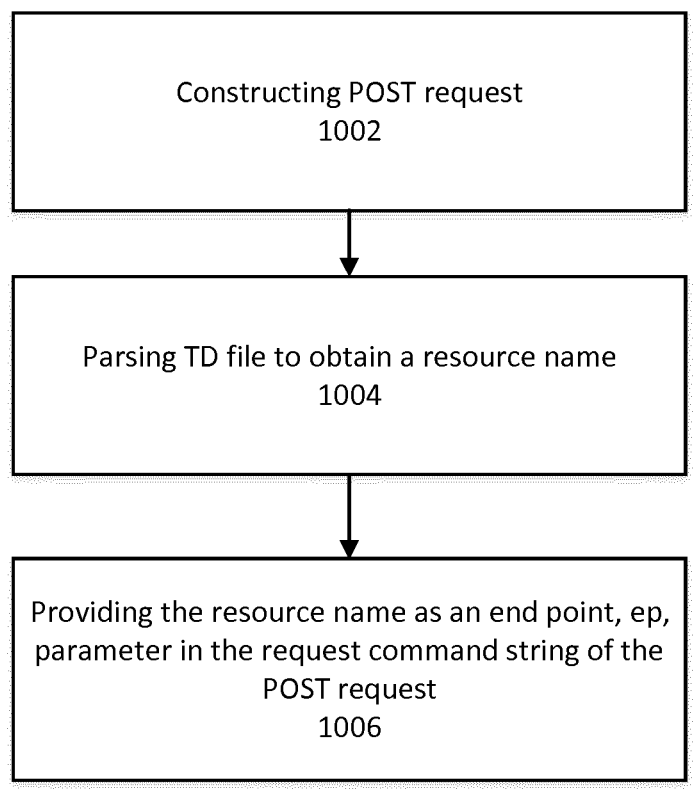

As described above and referring to FIG. 10, mapping the Thing Description file to the Resource Directory registration command may include constructing a POST request including a request command string and a payload (block 1002), parsing the Thing Description file to obtain a resource name of a resource or resources described by the Thing Description file (block 1004), and providing the resource name as an end point, ep, parameter in the request command string of the POST request (block 1006).

Figure 11:
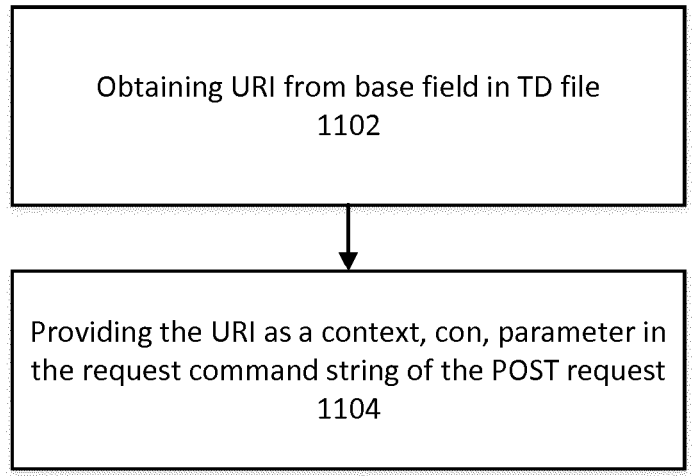

Referring to FIG. 11, the method may further include obtaining a uniform resource identifier, URI, associated with the resource from a base field in the Thing Description file (block 1102), and providing the URI as a context, con, parameter in the request command string of the POST request (block 1104).

Figure 12:
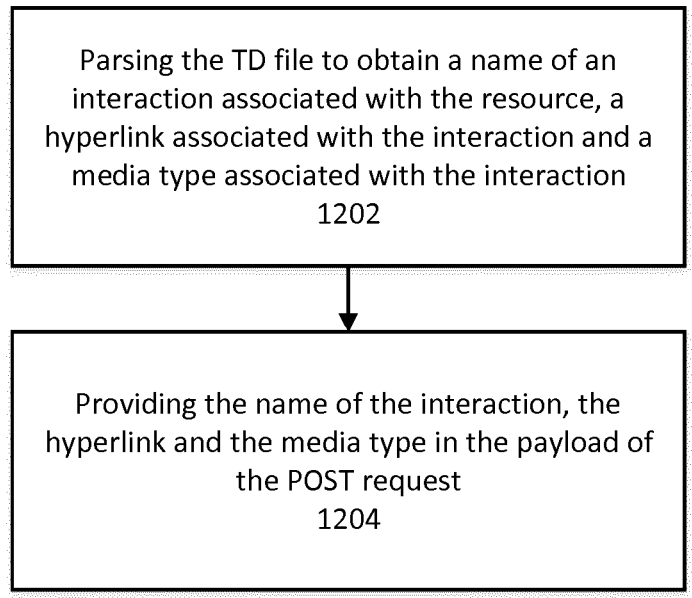

Referring to FIG. 12, mapping the Thing Description file to the Resource Directory registration command may further include parsing the Thing Description file to obtain a name of an interaction associated with the resource, a hyperlink associated with the interaction, and a media type associated with the hyperlink (block 1202), and providing the name of the interaction, the hyperlink and the media type in the payload of the POST request (block 1204).

Providing the name of the interaction, the hyperlink and the media type in the payload of the POST request may include parsing the hyperlink to obtain a pathname and a target, and converting the media type to a media type number. The payload of the POST request may include an opening tag including the target obtained from the hyperlink, a content type, ct, field including the media type number, a resource type, rt, field including the name of the interaction, and an anchor field including the pathname obtained from the hyperlink.

In some embodiments, the Thing Description file may include multiple interactions. Accordingly, mapping the Thing Description file to the Resource Directory registration command may further include parsing the Thing Description file to obtain names of a plurality of interactions associated with the resource, hyperlinks associated with the respective interactions, and media types associated with the respective hyperlinks, and providing the names of the interactions, the hyperlinks and the media types in the payload of the POST request. Moreover, providing the names of the interactions, the hyperlinks and the media types in the payload of the POST request may include parsing the hyperlinks to provide respective pathnames and targets, and converting the media types to respective media type numbers.

The payload of the POST request may include for each of the plurality of interactions an opening tag including the target obtained from the hyperlink of the respective interaction, a content type, ct, field including the media type number of the respective interaction, a resource type, rt, field including the name of the respective interaction, and an anchor field including the pathname obtained from the hyperlink of the respective interaction.

Figure 13:
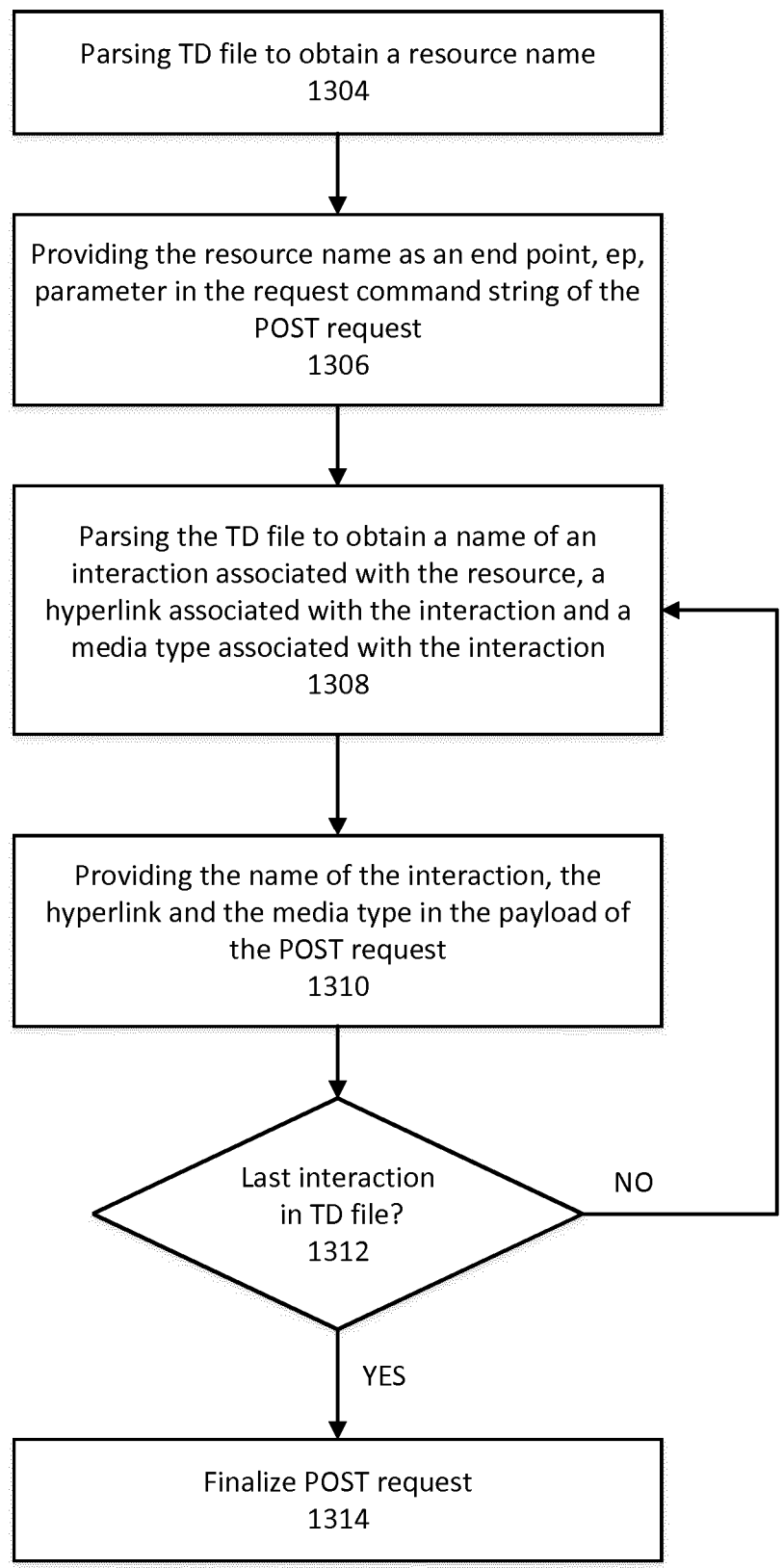

Parsing a Thing Description file including multiple interactions is illustrated in FIG. 13. As shown therein, the operations include parsing the Thing Description file to obtain a resource name of a resource described by the Thing Description file (block 1304), and providing the resource name as an end point, ep, parameter in the request command string of the POST request (block 1306). The Thing Description file is then parsed to obtain a name of an interaction associated with the resource, a hyperlink associated with the interaction, and a media type associated with the hyperlink (block 1308), and providing the name of the interaction, the hyperlink and the media type in the payload of the POST request (block 1310).

The operations then check to see if there are any more interactions in the Thing Description file (block 1312), and if so, operations return to block 1308 to process the next interaction in the file. Otherwise, operations proceed to block 1314 to finalize the POST request.

Some further embodiments provide an Internet of Things, IoT, device adapted to provide a Thing Description file for the IoT device, the Thing Description file including a formatted record describing a resource provided by the IoT device, map the Thing Description file to a Resource Directory registration command, and send the Resource Directory registration command to a Resource Directory to register the resource in the Resource Directory.

Some further embodiments provide a computing device adapted to provide a Thing Description file for an IoT device, the Thing Description file including a formatted record describing a resource or resources provided by the IoT device, map the Thing Description file to a Resource Directory registration command, and send the Resource Directory registration command to a Resource Directory to register the resource in the Resource Directory.

Still further embodiments provide a computer program product including a non-transitory computer readable storage medium having computer readable program code embodied in the medium, the computer readable program code comprising computer readable program code configured to provide a Thing Description file for an IoT device, the Thing Description file including a formatted record describing a resource provided by the IoT device, map the Thing Description file to a Resource Directory registration command, and send the Resource Directory registration command to a Resource Directory to register the resource in the Resource Directory.

Definitions

CoAP Constrained Application Protocol
CoRE Constrained RESTful Environment
HTTP Hypertext Transport Protocol
IETF Internet Engineering Task Force
IoT Internet of Things
JSON JavaScript Object Notation
RD Resource Directory
REST Representational State Transfer
TD Thing Description
URI Uniform Resource Identifier
URL Uniform Resource Locator
W3C World Wide Web Consortium
XML Extensible Markup Language Further definitions and embodiments are discussed below.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

The embodiments described herein provide useful physical machines and particularly configured computer hardware arrangements of computing devices, servers, constrained devices, processors, memory, networks, for example, generally referred to herein as a "computing device." With reference to the Figures, illustrative systems for implementing the described techniques include a general purpose computing device in the form of a computer, such as a mobile computing device or a fixed computing device. Components of the computer may include, but are not limited to, a processing unit including a processor circuit, such as a programmable microprocessor or microcontroller, a system memory, and a system bus that couples various system components including the system memory to the processing unit.

For non-constrained devices, the processor circuit may be a multi-core processor including two or more independent processing units. Each of the cores in the processor circuit may support multi-threading operations, i.e., may have the capability to execute multiple processes or threads concurrently. Additionally, the processor circuit may have an on-board memory cache. An example of a suitable multi-core, multithreaded processor circuit is an Intel Core i7-7920HQ processor, which has four cores that support eight threads each and has an 8 MB on-board cache. In general, the processor circuit may, for example, include any type of general-purpose microprocessor or microcontroller, a digital signal processing (DSP) processor, an integrated circuit, a field programmable gate array (FPGA), a reconfigurable processor, a programmable read-only memory (PROM), or any combination thereof. For constrained devices, the processor may, for example, include an 8-bit or 16-bit microprocessor or microcontroller with or without built-in memory.

The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device may include a variety of computer readable media. Computer readable media can be any available media that can be accessed by computer and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory includes computer storage media in the form of volatile and/or nonvolatile memory such as read only memory (ROM) and random access memory (RAM). A basic input/output system (BIOS), containing the basic routines that help to transfer information between elements within the computer, such as during start-up, is typically stored in the ROM. The RAM typically contains data and/or program modules that are immediately accessible to and/or presently being operated on by the processing unit. The system memory may store an operating system, application programs, other program modules, and program data.

The computing device may also include other removable/non-removable, volatile/nonvolatile computer storage media. By way of example only, the computer may include a hard disk drive reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive is typically connected to the system bus through a non-removable memory interface.

The drives and their associated computer storage media discussed above provide storage of computer readable instructions, data structures, program modules and other data for the computer. A user may enter commands and information into the computer through input devices such as a keyboard and pointing device, commonly referred to as a mouse, trackball or touch pad. Other input devices (not shown) may include a microphone, joystick, game pad, satellite dish, scanner, touchscreen, or the like. These and other input devices are often connected to the processing unit through a user input interface that is coupled to the system bus, but may be connected by other interface and bus structures, such as a parallel port, game port or a universal serial bus (USB). A monitor or other type of display device is also connected to the system bus via an interface, such as a video interface. In addition to the monitor, computers may also include other peripheral output devices such as speakers and a printer, which may be connected through an output peripheral interface.

The computing device may operate in a networked environment using logical connections to one or more remote computers, such as a remote computer. The remote computer may be a personal computer, a server, a router, a network PC, a peer device or other common network node, and typically includes many or all of the elements described above relative to the computer. The logical connections include a local area network (LAN) connection and a wide area network (WAN) connection, but may also include other networks. Such networking environments are commonplace in offices, enterprise-wide computer networks, intranets and the Internet.

When used in a LAN networking environment, the computing device may be connected to the LAN through a network interface or adapter. When used in a WAN networking environment, the computing device may include a modem or other means for establishing communications over the WAN. The modem, which may be internal or external, may be connected to the system bus via the user input interface, or other appropriate mechanism.

Some embodiments of the present inventive concepts are described herein with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in an object oriented programming language such as Java or C++. However, the computer program code for carrying out operations of the present invention may also be written in conventional procedural programming languages, such as the "C" or JavaScript programming language. The program code may execute entirely on the user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

The invention claimed is:

1. A method, comprising:
providing a Thing Description file for an Internet of Things, IoT, device, the Thing Description file including information describing interactions of a resource provided by the IoT device;
mapping the Thing Description file to a Resource Directory registration command; and
transmitting the Resource Directory registration command to a Resource Directory to register the resource in the Resource Directory;
wherein the Thing Description file is serialized in a JavaScript object notation, JSON, format; and
wherein a payload of operations in the registration command are serialized in a constrained RESTful environment, CoRE, link format.

2. The method of claim 1, wherein mapping the Thing Description file to the Resource Directory registration command comprises:
constructing a POST request including a request command string and a payload;
parsing the Thing Description file to obtain a resource name of a resource described by the Thing Description file; and
providing the resource name as an end point, ep, parameter in the request command string of the POST request.

3. The method of claim 2, further comprising:
obtaining a uniform resource identifier, URI, associated with the resource from a base field in the Thing Description file; and
providing the URI as a context, con, parameter in the request command string of the POST request.

4. The method of claim 2, wherein mapping the Thing Description file to the Resource Directory registration command further comprises:
parsing the Thing Description file to obtain a name of an interaction associated with the resource, a hyperlink associated with the interaction, and a media type associated with the hyperlink; and
providing the name of the interaction, the hyperlink and the media type in the payload of the POST request.

5. The method of claim 4, wherein providing the name of the interaction, the hyperlink and the media type in the payload of the POST request comprises:
parsing the hyperlink to obtain a pathname and a target; and
converting the media type to a media type number.

6. The method of claim 5, wherein the payload of the POST request comprises:
the target obtained from the hyperlink;
a content type field including the media type number;
a resource type field including the name of the interaction; and
an anchor field including the pathname obtained from the hyperlink.

7. The method of claim 2, wherein mapping the Thing Description file to the Resource Directory registration command further comprises:
parsing the Thing Description file to obtain names of a plurality of interactions associated with the resource, hyperlinks associated with the respective interactions, and media types associated with the respective hyperlinks; and
providing the names of the interactions, the hyperlinks and the media types in the payload of the POST request.

8. The method of claim 7, wherein providing the names of the interactions, the hyperlinks and the media types in the payload of the POST request comprises:
parsing the hyperlinks to provide respective pathnames and targets; and
converting the media types to respective media type numbers.

9. The method of claim 8, wherein the payload of the POST request comprises:
for each of the plurality of interactions:
an opening tag including the target obtained from the hyperlink of the respective interaction;
a content type field including the media type number of the respective interaction;
a resource type field including the name of the respective interaction; and
an anchor field including the pathname obtained from the hyperlink of the respective interaction.

10. An Internet of Things, IoT, device, comprising:
a processor;
a memory coupled to the processor; and
a transceiver coupled to the processor;
wherein the processor is configured to perform operations comprising:
providing a Thing Description file for the IoT device, the Thing Description file including information describing interactions of a resource provided by the IoT device;
mapping the Thing Description file to a Resource Directory registration command; and
transmitting, via the transceiver, the Resource Directory registration command to a Resource Directory to register the resource in the Resource Directory;
wherein the Thing Description file is serialized in a JavaScript object notation, JSON, format; and
wherein a payload of operations in the Resource Directory are serialized in a constrained RESTful environment, CoRE, link format.

11. The IoT device of claim 10, wherein mapping the Thing Description file to the Resource Directory registration command comprises:
constructing a POST request including a request command string and a payload;
parsing the Thing Description file to obtain a resource name of a resource described by the Thing Description file; and
providing the resource name as an end point, ep, parameter in the request command string of the POST request.

12. The IoT device of claim 11, further comprising:
obtaining a uniform resource identifier, URI, associated with the resource from a base field in the Thing Description file; and
providing the URI as a context, con, parameter in the request command string of the POST request.

13. The IoT device of claim 11, wherein mapping the Thing Description file to the Resource Directory registration command further comprises:
parsing the Thing Description file to obtain a name of an interaction associated with the resource, a hyperlink associated with the interaction, and a media type associated with the hyperlink; and
providing the name of the interaction, the hyperlink and the media type in the payload of the POST request.

14. The IoT device of claim 13, wherein providing the name of the interaction, the hyperlink and the media type in the payload of the POST request comprises:
- parsing the hyperlink to obtain a pathname and a target; and
- converting the media type to a media type number.

15. The IoT device of claim 14, wherein the payload of the POST request comprises:
- the target obtained from the hyperlink;
- a content type field including the media type number;
- a resource type field including the name of the interaction; and
- an anchor field including the pathname obtained from the hyperlink.

16. The IoT device of claim 11, wherein mapping the Thing Description file to the Resource Directory registration command further comprises:
- parsing the Thing Description file to obtain names of a plurality of interactions associated with the resource, hyperlinks associated with the respective interactions, and media types associated with the respective hyperlinks; and
- providing the names of the interactions, the hyperlinks and the media types in the payload of the POST request.

17. The IoT device of claim 16, wherein providing the names of the interactions, the hyperlinks and the media types in the payload of the POST request comprises:
- parsing the hyperlinks to provide respective pathnames and targets; and
- converting the media types to respective media type numbers.

18. The IoT device of claim 17, wherein the payload of the POST request comprises:
- for each of the plurality of interactions:
  - an opening tag including the target obtained from the hyperlink of the respective interaction;
  - a content type field including the media type number of the respective interaction;
  - a resource type field including the name of the respective interaction; and
  - an anchor field including the pathname obtained from the hyperlink of the respective interaction.

19. A server, comprising:
- a processor;
- a memory coupled to the processor; and
- a network interface coupled to the processor;
- wherein the processor is configured to perform operations according to claim 1.

20. A computing device, wherein the computing device is adapted to perform operations according to claim 1.

21. A computer program product comprising:
- a non-transitory computer readable storage medium having computer readable program code embodied in the medium, the computer readable program code comprising:
- computer readable program code configured to perform operations according to claim 1.

* * * * *